US012746674B2

(12) United States Patent
Zhang et al.

(10) Patent No.: US 12,746,674 B2
(45) Date of Patent: Sep. 29, 2026

(54) TASK EXECUTION METHOD AND APPARATUS, DEVICE, AND COMPUTER MEDIUM

(71) Applicant: Beijing Youzhuju Network Technology Co., Ltd., Beijing (CN)

(72) Inventors: Hanbo Zhang, Beijing (CN); Jie Xu, Beijing (CN); Yifeng Li, Beijing (CN); Tao Kong, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 16 days.

(21) Appl. No.: 18/945,322

(22) Filed: Nov. 12, 2024

(65) Prior Publication Data

US 2025/0242496 A1 Jul. 31, 2025

(30) Foreign Application Priority Data

Jan. 30, 2024 (CN) ......................... 202410130685.5

(51) Int. Cl.

| | |
|---|---|
| ***B25J 9/16*** | (2006.01) |
| ***G06T 7/10*** | (2017.01) |
| ***G06T 17/00*** | (2006.01) |

(52) U.S. Cl.

CPC ........... *B25J 9/1669* (2013.01); *B25J 9/1664* (2013.01); *B25J 9/1697* (2013.01); *G06T 7/10* (2017.01); *G06T 17/00* (2013.01)

(58) Field of Classification Search

CPC ...... B25J 9/1669; B25J 9/1664; B25J 9/1697; B25J 9/16; G06T 7/10; G06T 17/00; G06F 3/011; G06V 10/235; G06V 10/267; G06V 10/764; G06V 20/35

USPC .......................................................... 700/259

See application file for complete search history.

(56) References Cited

U.S. PATENT DOCUMENTS

| | | | | |
|---|---|---|---|---|
| 11,559,902 | B2 * | 1/2023 | Song | B25J 9/1635 |
| 2012/0072023 | A1 * | 3/2012 | Ota | B25J 9/1664 901/1 |
| 2017/0320210 | A1 | 11/2017 | Ding et al. | |
| 2018/0043532 | A1 * | 2/2018 | Lection | B25J 9/1661 |
| 2023/0028730 | A1 * | 1/2023 | Takata | G06F 3/011 |
| 2023/0162494 | A1 * | 5/2023 | Banerjee | G05D 1/0016 382/153 |

(Continued)

FOREIGN PATENT DOCUMENTS

| | | | |
|---|---|---|---|
| AU | 2020200017 | A1 | 1/2020 |
| CN | 110109541 | B | 4/2022 |
| CN | 116460846 | A | 7/2023 |

(Continued)

OTHER PUBLICATIONS

Office Action received for Chinese Patent Application No. 202410130685.5, mailed on Dec. 17, 2025, 14 pages (7 pages of English Translation and 7 pages of Original Document).

*Primary Examiner* — Kira Nguyen

(74) *Attorney, Agent, or Firm* — Astute IP Law Group

(57) ABSTRACT

The present disclosure discloses a task execution method and apparatus, a device, and a computer medium. The method includes: displaying acquired environment image information; and controlling a holding apparatus to execute a task corresponding to an operation of a user on the environment image information in response to the operation of the user on the environment image information.

19 Claims, 2 Drawing Sheets

(56) References Cited

U.S. PATENT DOCUMENTS

2024/0269826 A1* 8/2024 Nakanishi .............. B25J 9/1692

FOREIGN PATENT DOCUMENTS

| | | | |
|---|---|---|---|
| CN | 116619374 | A | 8/2023 |
| CN | 116938990 | A | 10/2023 |
| CN | 116974272 | A | 10/2023 |

* cited by examiner

TASK EXECUTION METHOD AND APPARATUS, DEVICE, AND COMPUTER MEDIUM

CROSS-REFERENCE TO RELATED APPLICATION

The present application claims priority to and is based on a Chinese application with an application Ser. No. 2/2410130685.5 and a filing date of Jan. 30, 2024, the aforementioned application is hereby incorporated by reference in its entirety.

TECHNICAL FIELD

The present disclosure belongs to the field of intelligent control technologies, and in particular, to a task execution method and apparatus, a device, and a computer medium.

BACKGROUND

With continuous development of artificial intelligence and intelligent robot technologies, intelligent robots have become an indispensable part of human life. Human-robot interaction technology is an important means for performing communication, control, and operation between humans and intelligent robots. The human-robot interaction technology aims to implement information exchange between humans and intelligent robots and information transmission in virtual and real space by using information such as voice, images, and touch. In the current social context of digitalization and informatization, human-robot interaction technology is more and more widely applied, not only in the field of personal consumption, such as smart phones, smart watches, and smart speakers, but also in the fields of medical care, education, entertainment, and the like. Meanwhile, with the rise of metaverse concept, human-robot interaction technology will also play a more important role in the aspect of virtual and real integration. Therefore, developing an intelligent, natural, and humanized human-robot interaction technology will be one of the important directions in the field of future technologies.

SUMMARY

Embodiments of the present disclosure provide a solution different from the related art, to solve the technical problem in the related art of low efficiency of interaction between the user and the intelligent robot.

According to a first aspect, the present disclosure provides a task execution method, applicable to an intelligent robot, the method comprising: displaying acquired environment image information; and controlling a holding apparatus to execute a task corresponding to an operation of a user on the environment image information in response to the operation of the user on the environment image information.

According to a second aspect, the present disclosure provides a task execution apparatus, comprising:

- a display unit, configured to display acquired environment image information; and
- a control unit, configured to control a holding apparatus to execute a task corresponding to an operation of a user on the environment image information in response to the operation of the user on the environment image information.

According to a third aspect, the present disclosure provides an electronic device, comprising:

- a processor; and
- a memory, configured to store executable instructions for the processor,
- wherein the processor is configured to perform the method according to any one of the first aspect or various possible implementations of the first aspect by executing the executable instructions.

According to a fourth aspect, an embodiment of the present disclosure provides a computer-readable storage medium having a computer program stored thereon, wherein the computer program, when executed by a processor, causes implementation of the method according to any one of the first aspect and various possible implementations of the first aspect.

BRIEF DESCRIPTION OF THE DRAWINGS

To more clearly describe the technical solutions in the embodiments of the present disclosure or the related art, the following briefly describes the accompanying drawings required for describing the embodiments or the related art. Apparently, the accompanying drawings in the following description show some embodiments of the present disclosure, and a person of ordinary skill in the art may still derive other drawings from these accompanying drawings without paying creative efforts. In the drawings.

DETAILED DESCRIPTION OF EMBODIMENTS

Figure 1:
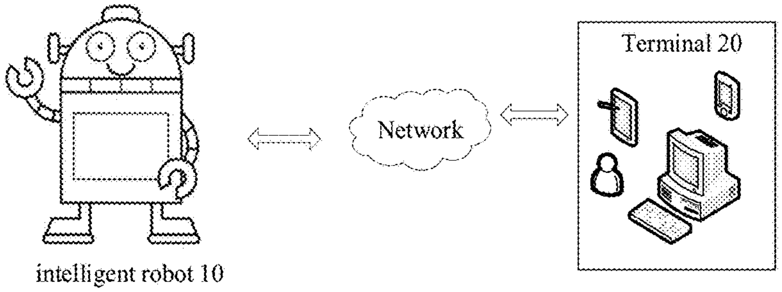
FIG. 1 is a schematic structural diagram of a task execution system according to an embodiment of the present disclosure.

Embodiments of the present disclosure are described in detail below, and examples of the embodiments are illustrated in the accompanying drawings. The embodiments described below with reference to the accompanying drawings are exemplary and are intended to be illustrative of the present disclosure, but should not be construed as limiting the present disclosure.

The terms "first" and "second" in the present disclosure are used to distinguish similar objects, but do not necessarily indicate a specific order or sequence. It should be understood that the data termed in such a way are interchangeable in appropriate circumstances so that embodiments of the present disclosure described herein can be implemented in orders other than those illustrated or described herein. In addition, the terms "include" and "have" and any variations thereof are intended to cover non-exclusive inclusion. For example, a process, method, system, product, or device that includes a series of steps or units is not necessarily limited to those steps or units clearly listed, but may include other steps or units not clearly listed or inherent to such process, method, product, or device.

With continuous development of artificial intelligence and intelligent robot technologies, intelligent robots have become an indispensable part of human life. Human-robot interaction technology is an important means for performing communication, control, and operation between humans and intelligent robots. The human-robot interaction technology aims to implement information exchange between humans and intelligent robots and information transmission in virtual and real space by using information such as voice, images, and touch. In the current social context of digitalization and informatization, human-robot interaction technology is more and more widely applied, not only in the field of personal consumption, such as smart phones, smart watches, and smart speakers, but also in the fields of medical care, education, entertainment, and the like. Meanwhile, with the rise of metaverse concept, human-robot interaction technology will also play a more important role in the aspect of virtual and real integration. Therefore, developing an intelligent, natural, and humanized human-robot interaction technology will be one of the important directions in the field of future technologies.

In the related art, a user needs to use a specific language or instructions to control an intelligent robot during interaction with the intelligent robot, which leads to more time consumption, resulting in low efficiency of interaction between the user and the intelligent robot. In addition, such an interaction manner is prone to ambiguity and misunderstanding, resulting in the intelligent robot's inability to accurately understand the user's intention. For example, when the user uses language to issue an instruction, due to the ambiguity of the language, multiple rounds of conversations are often required to complete the task. This not only wastes the user's time, but also deteriorates the user's experience and satisfaction degree.

In addition, the existing intelligent robot technology also has certain security risks. Since the intelligent robot cannot accurately identify the user's identity and permission, it is liable to be manipulated by unauthorized persons, resulting in the intelligent robot executing wrong instructions or operations. This not only poses a threat to the user's property and safety, but also adversely affects the security and stability of the intelligent robot itself.

The present application provides a solution to solve the foregoing problems.

A technical solution of the present disclosure and how the technical solution of the present disclosure solves the above technical problems are described in detail below with specific embodiments. The following specific embodiments can be combined with each other, and the same or similar concepts or processes may not be repeated in some embodiments. Embodiments of the present disclosure will be described below in conjunction with the accompanying drawings.

First, FIG. 1 is a schematic diagram of a structure of a task execution system according to an exemplary embodiment of the present disclosure. The structure comprises an intelligent robot 10, and the intelligent robot 10 can be configured to: display acquired environment image information; and control a holding apparatus to execute a task corresponding to an operation of a user on the environment image information in response to the operation of the user on the environment image information.

Specifically, the intelligent robot 10 may be provided with a display screen, an image acquisition apparatus, and the foregoing holding apparatus. The image acquisition apparatus may be configured to acquire the environment image information, the foregoing display screen may be configured to display the environment image information, and the holding apparatus may hold an object, for example, a water cup or a table tennis ball. In some other optional embodiments of the present application, the foregoing task execution system further comprises a terminal 20.

The intelligent robot 10 may acquire the environment image information by using the image acquisition apparatus, and send the environment image information to the terminal 20, for the terminal 20 to display the environment image information. The foregoing displaying the acquired environment image information means sending the acquired environment image information to the terminal 20, so that the terminal 20 displays the environment image information.

Optionally, the foregoing controlling the holding apparatus to execute the task corresponding to the operation of the user on the environment image information in response to the operation may mean that the terminal 20 sends, in response to the operation of the user on the environment image information, relevant information about the operation to the intelligent robot 10, so that the intelligent robot 10 controls the holding apparatus to execute the task corresponding to the operation.

For execution principles and interaction processes of the components in the system embodiment, such as the intelligent robot 10 and the terminal 20, reference may be made to the descriptions of the following method embodiments.

Figure 2A:
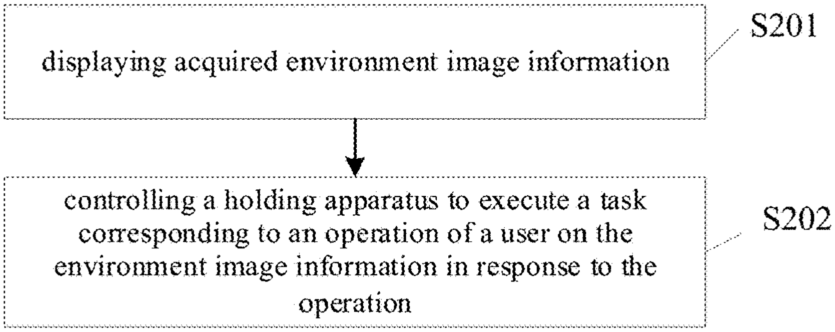
FIG. 2A is a schematic flowchart of a task execution method according to an embodiment of the present disclosure.

FIG. 2A is a schematic flowchart of a task execution method according to an exemplary embodiment of the present disclosure. The method may be applicable to an intelligent robot, and at least comprises the following steps:

S201: Display acquired environment image information.

In some optional embodiments of the present application, an intelligent robot may be provided with an image acquisition apparatus, which may acquire surrounding image information, for example, environment image information.

The intelligent robot may be provided with a display screen, and the foregoing displaying the acquired environment image information may comprise displaying the acquired environment image information through the display screen.

Optionally, the foregoing displaying the acquired environment image information may also mean: acquiring the environment image information by using the image acquisition apparatus, and sending the environment image information to a terminal, for the terminal to display the environment image information.

In some optional embodiments of the present application, the intelligent robot may specifically adjust an angle of the image acquisition apparatus based on an angle adjustment instruction from the user, to use shot content corresponding to the angle as the environment image information.

S202: Control the holding apparatus to execute the task corresponding to the operation in response to the operation of the user on the environment image information.

In some optional embodiments of the present application, the user may operate on the environment image information through the display screen of the intelligent robot or the display screen of the terminal.

In some optional embodiments of the present application, the method further comprises the following S01 to S03.

S01: Perform instance segmentation on the environment image information to obtain at least one first instance corresponding to at least one object comprised in the environment image information.

Optionally, the object may be an object in the environment image information, such as a tree, a table, a person, or the like.

Optionally, there is a one-to-one correspondence between the objects and the first instances.

Optionally, the first instance in the present application refers to mask information.

Optionally, an output of the instance segmentation model is a group of masks or contours that outline each object in the image, as well as a class label and a confidence score of each object. The class label and the confidence score herein may also refer to the first instance.

S02: Display the at least one first instance.

In some optional embodiments of the present application, the foregoing displaying the at least one first instance may mean that the intelligent robot displays the at least one first instance through its own display screen, or may mean sending the at least one first instance to a terminal, for the terminal to display the at least one first instance.

In some other optional embodiments of the present application, the foregoing S01 and S02 may be performed by the terminal.

Figure 2B:
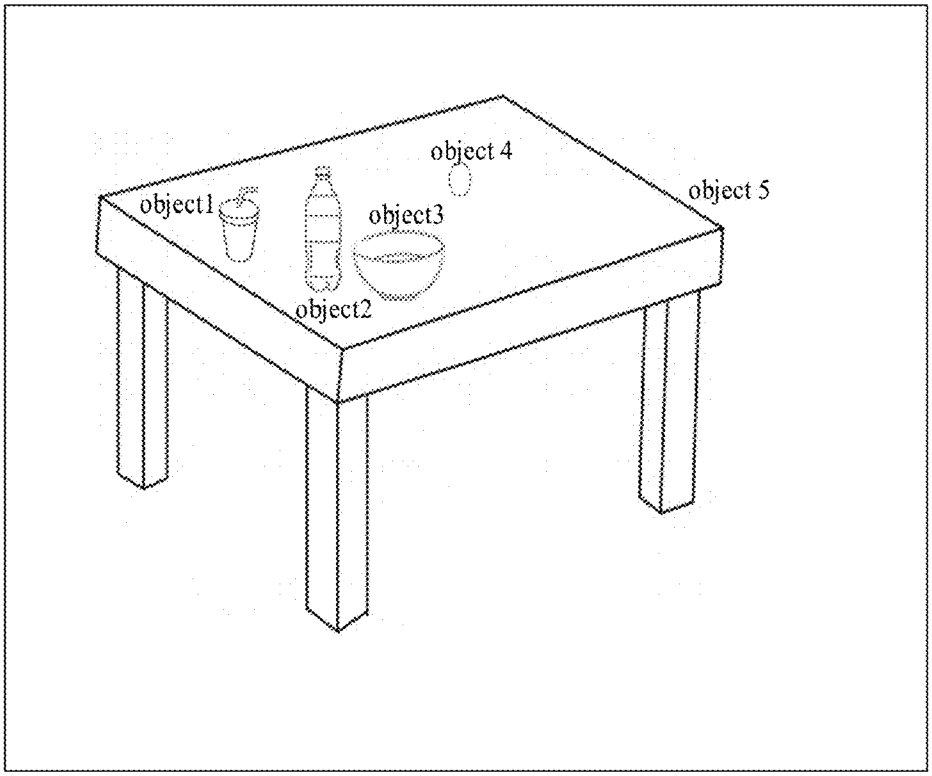
FIG. 2B is a schematic diagram of environment image information according to an embodiment of the present disclosure.

In some optional embodiments of the present application, the foregoing environment image information may be shown in FIG. 2B, where the environment image information may comprise a plurality of objects, such as a beverage bottle 1 (object 1), a beverage bottle 2 (object 2), a bowl (object 3), an egg (object 4), and a table (object 5) in the figure.

Figure 2C:
FIG. 2C is a schematic diagram of at least one first instance according to an embodiment of the present disclosure.

Optionally, the aforementioned displayed at least one first instance may be shown in FIG. 2C. When the first instances are displayed, display positions of the first instances may be random, which is not limited in the present application.

Optionally, the foregoing displaying the acquired environment image information may also mean: acquiring the environment image information by using the image acquisition apparatus, and sending the environment image information to a terminal, for the terminal to display the environment image information.

In some optional embodiments of the present application, the intelligent robot may specifically adjust an angle of the image acquisition apparatus based on an angle adjustment instruction from the user, to use shot content corresponding to the angle as the environment image information.

S03: Determine a target instance that is operated on and a task to be executed for the target instance in response to an operation of the user on any first instance in the at least one first instance.

In some optional embodiments of the present application, the operation of the user on the target instance comprises any one or more of the following operations: an operation of the user to move the target instance; an operation of the user to rotate the target instance; and an operation of the user on the target instance itself.

In some optional embodiments of the present application, the operation of the user on the target instance itself may comprise an operation of the user to split the target instance.

Optionally, in S202, the operation of the user on the environment image information means the operation of the user on any first instance in the at least one first instance. In S202, the controlling the holding apparatus to execute the task corresponding to the operation of the user on the environment image information in response to the operation comprises: when it is detected that the user operates on any first instance in the at least one first instance, determining a target instance that is operated on and the task to be executed for the target instance; and controlling, based on the operation, the holding apparatus to execute the task to be executed for the target instance.

Further, in S202, the controlling the holding apparatus to execute the task corresponding to the operation comprises: controlling, based on the operation, the holding apparatus to execute the task to be executed for the target instance.

In some optional embodiments of the present application, when the operation of the user on the target instance is an operation of the user to move the target instance, the task to be executed for the target instance is to move an object corresponding to the target instance.

In some optional embodiments of the present application, when the operation of the user on the target instance is an operation of the user to rotate the target instance, the task to be executed for the target instance is to rotate the object corresponding to the target instance.

In some optional embodiments of the present application, when the operation of the user on the target instance itself is an operation of the user to split the target instance, the task to be executed for the target instance is to split the object corresponding to the target instance.

In some embodiments, for example, when the target instance is an instance corresponding to a bottle, when the operation of the user on the target instance itself is an operation of the user to split the target instance, the task to be executed for the target instance is to unscrew the bottle corresponding to the target instance.

In some optional embodiments of the present application, in S02, the displaying the at least one first instance comprises: displaying some first instances in the at least one first instance.

Optionally, the some first instances are first instances in the at least one first instance that meet a preset condition.

Optionally, a first instance with a size less than a preset size in the at least one first instance is regarded as a first instance that meets the preset condition.

In some optional embodiments of the present application, in S02, the displaying the at least one first instance comprises: displaying some first instances in the at least one first instance, and displaying objects corresponding to remaining instances in the at least one first instance other than the some first instances.

Figure 2D:
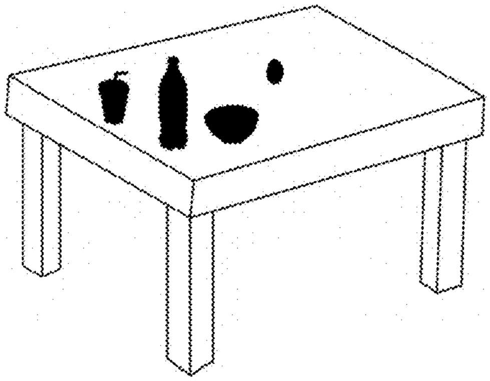
FIG. 2D is a schematic diagram of specific display content in the task execution method according to an embodiment of the present disclosure.

Specifically, reference may be made to FIG. 2D. When the some first instances and the objects corresponding to the remaining instances are displayed, positions of the first instances and the objects may remain unchanged.

In some optional embodiments of the present application, the method further comprises the following S11 and S12:

S11: For any object in the at least one object, obtain an instruction from the user for performing instance segmentation on the object, and perform instance segmentation on the object to obtain at least one second instance corresponding to the object;

Optionally, the user may trigger the instruction for performing instance segmentation on the object by clicking the object on a display screen.

S12: Use the at least one second instance as a first instance corresponding to the object.

In some optional embodiments of the present application, the operation of the user on the target instance is implemented in any one or more of the following manners: clicking the target instance, and sliding the target instance.

Optionally, the user may implement selection of the target instance by clicking the target instance.

Optionally, the user may implement movement and/or rotation of the target instance by sliding the target instance.

In some optional embodiments of the present application, the method further comprises the following S21 and S22:

S21: Determine, for each first instance in the at least one first instance, a three-dimensional model corresponding to the first instance;

Optionally, the foregoing operation on the target instance may be an operation on the three-dimensional model corresponding to the target instance.

In some optional embodiments of the present application, the determining, for each first instance in the at least one first instance, a three-dimensional model corresponding to the first instance comprises: for each first instance in the at least one first instance, inputting the first instance into a preset three-dimensional model creation model to obtain the three-dimensional model corresponding to the first instance.

In some optional embodiments of the present application, the determining, for each first instance in the at least one first instance, a three-dimensional model corresponding to the first instance comprises: for each first instance in the at least one first instance, obtaining, based on a preset correspondence table, the three-dimensional model corresponding to the first instance. The correspondence table may store a plurality of instances and three-dimensional models corresponding to the instances.

S22: Displaying the at least one first instance comprises: displaying at least one three-dimensional model corresponding to the at least one first instance.

In some optional embodiments of the present application, the controlling, based on the operation, the holding apparatus to execute the task to be executed for the target instance comprises the following S1 to S3:

S1: Determine, from the environment image information, an object to be held corresponding to the target instance;

S2: Determine, based on the operation, movement parameter information of the object to be held;

In some optional embodiments of the present application, the determining the movement parameter information of the object to be held based on the operation comprises:

- when the operation is an operation of the user to move the target instance, obtaining an initial position of the target instance;
- obtaining a target position to which the target instance is moved; and
- determining the movement parameter information of the object to be held based on the initial position and the target position.

In some optional embodiments, the determining the movement parameter information of the object to be held based on the initial position and the target position comprises: determining a movement trajectory of the holding apparatus based on the initial position and the target position; and determining the movement parameter information of the object to be held based on the movement trajectory.

In some optional embodiments of the present application, the determining the movement trajectory of the holding apparatus based on the initial position and the target position may comprise:

- obtaining image information comprising the initial position and the target position; and
- planning the movement trajectory of the holding apparatus based on the image information.

Optionally, when the movement trajectory of the holding apparatus is planned based on the image information, the movement trajectory of the holding apparatus may be specifically planned according to a principle of avoiding any obstacle between the initial position and the target position.

In some optional embodiments of the present application, the foregoing image information comprising the initial position and the target position may be some image information in the foregoing environment image information.

In some optional embodiments, the determining the movement parameter information of the object to be held based on the initial position and the target position comprises: determining a movement trajectory of the holding apparatus based on the initial position and the target position; and determining the movement parameter information of the object to be held based on the initial position, the target position, and the movement trajectory.

Optionally, the determining the movement parameter information of the object to be held based on the movement trajectory comprises: using the movement trajectory as the movement parameter information of the object to be held.

Optionally, the determining the movement parameter information of the object to be held based on the initial position, the target position, and the movement trajectory comprises: using the initial position, the target position, and the movement trajectory as the movement parameter information of the object to be held.

In some optional embodiments, the determining the movement parameter information of the object to be held based on the initial position and the target position comprises: determining the initial position and the target position as the movement parameter information of the object to be held.

In some optional embodiments of the present application, the determining the rotation parameter information of the object to be held based on the operation comprises:

- when the operation is an operation of the user to rotate the target instance, obtaining an initial pose of the target instance;
- obtaining a target pose to which the target instance is rotated; and
- determining the rotation parameter information of the object to be held based on the initial pose and the target pose.

In some optional embodiments, the determining the rotation parameter information of the object to be held based on the initial pose and the target pose comprises: determining the initial pose and the target pose as the rotation parameter information of the object to be held.

In some optional embodiments, the determining the rotation parameter information of the object to be held based on the initial pose and the target pose comprises: determining a movement trajectory of the holding apparatus based on the initial pose and the target pose; and determining the rotation parameter information of the object to be held based on the movement trajectory.

In some optional embodiments, the determining the rotation parameter information of the object to be held based on the initial pose and the target pose comprises: determining a movement trajectory of the holding apparatus based on the initial pose and the target pose; and determining the rotation parameter information of the object to be held based on the initial pose, the target pose, and the movement trajectory.

Optionally, the determining the movement parameter information of the object to be held based on the movement trajectory comprises: using the movement trajectory as the movement parameter information of the object to be held.

Optionally, the determining the movement parameter information of the object to be held based on the initial pose, the target pose, and the movement trajectory comprises:

determining the initial pose, the target pose, and the movement trajectory as the movement parameter information of the object to be held.

In some optional embodiments of the present application, the determining the movement parameter information of the object to be held based on the operation comprises:

- when the operation is an operation of the user to split the target instance, obtaining a plurality of initial positions of a plurality of sub-instances comprised in the target instance, where there is a one-to-one correspondence between the sub-instances and the initial positions;
- obtaining a plurality of target positions of the plurality of sub-instances; and
- determining the movement parameter information of the object to be held based on the plurality of initial positions and the plurality of target positions.

In some optional embodiments, the determining the movement parameter information of the object to be held based on the plurality of initial positions and the plurality of target positions comprises: determining the plurality of initial positions and the plurality of target positions as the movement parameter information of the object to be held.

In some optional embodiments, the determining the movement parameter information of the object to be held based on the plurality of initial positions and the plurality of target positions comprises: determining a movement trajectory of the holding apparatus based on the plurality of initial positions and the plurality of target positions; and using the movement trajectory as the movement parameter information of the object to be held.

S3: Control the holding apparatus to execute the task to be executed for the target instance based on the movement parameter information.

In some optional embodiments of the present application, the controlling the holding apparatus to execute the task to be executed for the target instance based on the movement parameter information may comprise:

- controlling the holding apparatus to move based on a movement trajectory determined based on the movement parameter information, to execute the task to be executed for the target instance.

In the process of controlling the holding apparatus to move, the target instance needs to hold, so as to implement the task to be executed for the target instance.

It should be noted that the movement trajectory provided in the present application may comprise a displacement or an angle change.

In some optional embodiments of the present application, when the user selects two first instances at the same time, the two first instances are two target instances. In this case, it may be determined that the task to be executed for the target instance is to stack objects corresponding to the two first instances. For example, when an object corresponding to one target instance is an egg and an object corresponding to the other target instance is a plate, the task to be executed for the target instance may be to place the egg on the plate.

Specifically, when the task to be executed for the target instance is to stack the objects corresponding to the two first instances, the controlling the holding apparatus to execute the task corresponding to the operation comprises: controlling the holding apparatus to place an object corresponding to a first instance with the smallest size in the two first instances on an object corresponding to the other first instance.

In some optional embodiments of the present application, when the operation of the user on the target instance is an operation of the user to move the target instance, the task to be executed for the target instance is to move an object corresponding to the target instance. If the movement parameter information comprises the initial position and the target position of the target instance and a movement trajectory of the holding apparatus, the controlling the holding apparatus to execute the task to be executed for the target instance based on the movement parameter information comprises:

- controlling the holding apparatus to move to the initial position, and hold the object corresponding to the target instance; and
- while holding the object corresponding to the target instance, moving based on the movement trajectory until moving to the target position, and then controlling to release the held object corresponding to the target instance.

The controlling to release the held object corresponding to the target instance means placing the object corresponding to the target instance at the target position.

In some optional embodiments of the present application, a pose of the holding apparatus when holding the object corresponding to the target instance may be generated by a holding posture detection model (for example, Contact-Graspnet).

Optionally, a placement pose of the object corresponding to the target instance may be determined based on a three-dimensional model corresponding to the target instance and a placement pose set by the user. Specifically, this may also be implemented in combination with a Planning Domain Definition Language (PDDL). This is not limited in the present application.

Optionally, a grasping pose when the target object is placed is generated based on the three-dimensional model of the target object instance and a target placement pose set by the user.

Optionally, the foregoing holding apparatus is a part of a structure of the intelligent robot. When the intelligent robot further comprises movement parameter information of other structures that need to be determined to facilitate execution of a corresponding task, the method further comprises determining movement parameter information of the other structures.

It should be noted that the movement trajectory of the holding apparatus determined in the present application is a collision-free movement trajectory generated by interpolation between the initial position and the target position.

It should be noted that the operation of the user on the environment image information in the present application may be an instruction triggered by the user through the display screen, or may be a voice instruction from the user based on content displayed on the display screen.

In some optional embodiments of the present application, when the holding apparatus holds the object corresponding to the target instance, whether the object corresponding to the target instance has been successfully held may be detected in real time by using a camera disposed at the holding apparatus. When the holding fails, the holding apparatus is controlled to be hold again, to ensure that the object corresponding to the target instance is successfully held.

The solution of present disclosure displaying the acquired environment image information; and controlling the holding apparatus to execute the task corresponding to the operation of the user on the environment image information in response to the operation of the user on the environment image information may enable the user to control the holding apparatus of the intelligent robot only based on the operation on the environment image information, without the need for complicated language or instructions, which leads to less time consumption and improves efficiency of interaction between the user and the intelligent robot.

In some optional embodiments of the present application, in order to improve security of controlling the intelligent robot, the method further comprises: obtaining image information of the user; and determining, based on the image information of the user, whether the user is a user who has permission to control the intelligent robot. If yes, the displaying of the acquired environment image information is triggered. In this way, security of the user in controlling the intelligent robot can be improved.

By means of the solution of the present application, interaction between the user and the intelligent robot can be implemented in a plurality of modalities, for example, an image, an instruction input on a display screen, a voice instruction, or the like, thereby improving efficiency of interaction between the user and the intelligent robot. In addition, the user can directly perform multi-modal interaction with the intelligent robot and preview a final task objective on the terminal, and control the robot to accurately complete the task, thereby implementing a WYSIWYG (What You See Is What You Get) robot control effect.

Figure 3:
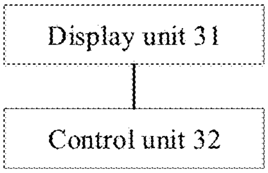
FIG. 3 is a schematic structural diagram of a task execution apparatus according to an embodiment of the present disclosure.

The present application further provides a task execution apparatus. FIG. 3 is a schematic structural diagram of the task execution apparatus. The apparatus comprises:

a display unit 31, configured to display acquired environment image information; and a control unit 32, configured to control a holding apparatus to execute a task corresponding to an operation of a user on the environment image information in response to the operation of the user on the environment image information.

According to one or more embodiments of the present disclosure, the apparatus is further configured to:

perform instance segmentation on the environment image information to obtain at least one first instance corresponding to at least one object comprised in the environment image information;

display the at least one first instance;

in response to an operation of the user on any first instance in the at least one first instance, determine a target instance that is operated on and a task to be executed for the target instance; and controlling the holding apparatus to execute the task corresponding to the operation comprises: controlling, based on the operation, the holding apparatus to execute the task to be executed for the target instance.

According to one or more embodiments of the present disclosure, the apparatus is further configured to:

for any object in the at least one object, obtain an instruction from the user for performing instance segmentation on the object, and perform instance segmentation on the object to obtain at least one second instance corresponding to the object; and use the at least one second instance as a first instance corresponding to the object.

According to one or more embodiments of the present disclosure, the operation of the user on the target instance comprises any one or more of the following operations:

an operation of the user to move the target instance;

an operation of the user to rotate the target instance; and an operation of the user on the target instance itself.

According to one or more embodiments of the present disclosure, the operation of the user on the target instance is implemented in any one or more of the following manners: clicking the target instance, and sliding the target instance.

According to one or more embodiments of the present disclosure, the apparatus is further configured to:

determine, for each first instance in the at least one first instance, a three-dimensional model corresponding to the first instance; and displaying the at least one first instance comprises: displaying at least one three-dimensional model corresponding to the at least one first instance.

According to one or more embodiments of the present disclosure, the apparatus, when being configured to control, based on the operation, the holding apparatus to execute the task to be executed for the target instance, is specifically configured to:

determine, from the environment image information, an object to be held corresponding to the target instance;

determine, based on the operation, movement parameter information of the object to be held; and control the holding apparatus to execute the task to be executed for the target instance based on the movement parameter information.

According to one or more embodiments of the present disclosure, the apparatus, when being configured to determine the movement parameter information of the object to be held based on the operation, is specifically configured to:

when the operation is an operation of the user to move the target instance, obtain an initial position of the target instance;

obtain a target position to which the target instance is moved; and determine the movement parameter information of the object to be held based on the initial position and the target position.

According to one or more embodiments of the present disclosure, the apparatus, when being configured to determine the movement parameter information of the object to be held based on the initial position and the target position, is specifically configured to:

determine a movement trajectory of the holding apparatus based on the initial position and the target position; and determine the movement parameter information of the object to be held based on the movement trajectory.

It should be understood that the apparatus embodiments may correspond to the method embodiments, and similar descriptions may refer to the method embodiments. To avoid repetition, details are not described herein again. Specifically, the apparatus may perform the method embodiments described above, and the foregoing and other operations and/or functions of modules in the apparatus respectively correspond to the corresponding processes in the methods in the method embodiments disclosed in the present disclosure. For the sake of brevity, details are not described herein again.

The apparatus according to the embodiments of the present disclosure is described above with reference to the accompanying drawings from the perspective of functional modules. It should be understood that the functional modules may be implemented in the form of hardware, or may be implemented by instructions in the form of software, or may be implemented by a combination of hardware and software modules. Specifically, each step in the method embodiments in the embodiments of the present disclosure may be completed by an integrated logic circuit of hardware in a processor and/or instructions in the form of software, and the steps of the method disclosed in the embodiments of the present disclosure may be directly embodied as being executed and completed by a hardware decoding processor, or may be executed and completed by a combination of the hardware and a software module in the decoding processor. Optionally, the software module may be located in a mature storage medium in the art, such as a random-access memory, a flash memory, a read-only memory, a programmable read-only memory, an electrically erasable programmable memory, or a register. The storage medium is located in a memory, and a processor reads information in the memory and completes the steps in the method embodiments described above in combination with the hardware.

Figure 4:
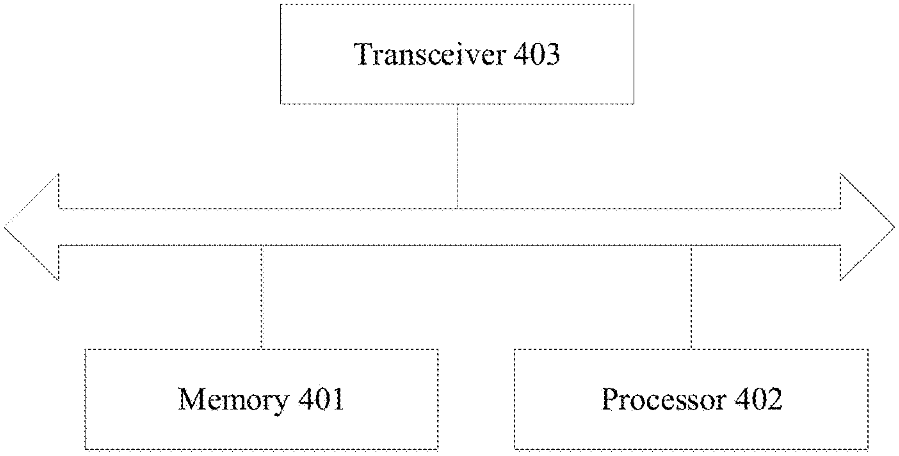
FIG. 4 is a schematic structural diagram of an electronic device according to an embodiment of the present disclosure.

FIG. 4 is a schematic block diagram of an electronic device according to an embodiment of the present disclosure. The electronic device may comprise:

a memory 401 and a processor 402, where the memory 401 is configured to store a computer program, and transmit program codes to the processor 402. In other words, the processor 402 may call and run the computer program from the memory 401 to implement the method in the embodiments of the present disclosure.

For example, the processor 402 may be configured to perform the foregoing method embodiments according to an instruction in the computer program.

In some embodiments of the present disclosure, the processor 402 may comprise but is not limited to:

a general-purpose processor, a digital signal processor (DSP), an application specific integrated circuit (ASIC), a field programmable gate array (FPGA), or another programmable logic device, a discrete gate or transistor logic device, or a discrete hardware component.

In some embodiments of the present disclosure, the memory 401 comprises but is not limited to:

a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) which is used as an external cache. By way of example but not limitation, many forms of RAM are available, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ES-DRAM), a synchlink dynamic random-access memory (SLDRAM), and a direct rambus random access memory (DR RAM).

In some embodiments of the present disclosure, the computer program may be divided into one or more modules, the one or more modules are stored in the memory 401, and are executed by the processor 402 to complete the method provided by the present disclosure. The one or more modules may be a series of computer program instruction segments capable of performing specific functions, and the instruction segments are used to describe an execution process of the computer program in the electronic device.

As shown in FIG. 4, the electronic device may further comprise:

a transceiver 403, which may be connected to the processor 402 or the memory 401.

The processor 402 may control the transceiver 403 to communicate with another device. Specifically, the processor 402 may send information or data to the other device, or receive information or data sent by the other device. The transceiver 403 may comprise a transmitter and a receiver. The transceiver 403 may further comprise an antenna, and there may be one or more antennas.

It should be understood that components in the electronic device are connected to each other through a bus system, where the bus system further comprises a power bus, a control bus, and a status signal bus in addition to a data bus.

The present disclosure further provides a computer storage medium having a computer program stored thereon, where the computer program, when executed by a computer, causes the computer to be able to perform the method in the method embodiments described above. Alternatively, an embodiment of the present disclosure further provides a computer program product comprising instructions, where the instructions, when executed by a computer, cause the computer to perform the method in the method embodiments described above.

When implemented in software, the entireties or parts of the technical solutions may be implemented in the form of a computer program product. The computer program product comprises one or more computer instructions. When the computer program instructions are loaded and executed on a computer, all or parts of the processes or functions according to the embodiments of the present disclosure are generated. The computer may be a general-purpose computer, a dedicated computer, a computer network, or another programmable apparatus. The computer instructions may be stored in a computer-readable storage medium or transmitted from one computer-readable storage medium to another computer-readable storage medium, for example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

According to one or more embodiments of the present disclosure, there is provided a task execution method, applicable to an intelligent robot, the method comprising:

displaying acquired environment image information; and controlling a holding apparatus to execute a task corresponding to an operation of a user on the environment image information in response to the operation of the user on the environment image information.

According to one or more embodiments of the present disclosure, the method further comprises:

performing instance segmentation on the environment image information to obtain at least one first instance corresponding to at least one object comprised in the environment image information;

displaying the at least one first instance;

in response to an operation of the user on any first instance in the at least one first instance, determining a target instance that is operated on and a task to be executed for the target instance; and controlling the holding apparatus to execute the task corresponding to the operation comprises: controlling, based on the operation, the holding apparatus to execute the task to be executed for the target instance.

According to one or more embodiments of the present disclosure, the method further comprises:

for any object in the at least one object, obtaining an instruction from the user for performing instance segmentation on the object, and performing instance segmentation on the object to obtain at least one second instance corresponding to the object; and using the at least one second instance as a first instance corresponding to the object.

According to one or more embodiments of the present disclosure, the operation of the user on the target instance comprises any one or more of the following operations:

an operation of the user to move the target instance;

an operation of the user to rotate the target instance; and an operation of the user on the target instance itself.

According to one or more embodiments of the present disclosure, the operation of the user on the target instance is implemented in any one or more of the following manners:

clicking the target instance, and sliding the target instance.

According to one or more embodiments of the present disclosure, the method further comprises:

determining, for each first instance in the at least one first instance, a three-dimensional model corresponding to the first instance; and displaying the at least one first instance comprises: displaying at least one three-dimensional model corresponding to the at least one first instance.

According to one or more embodiments of the present disclosure, the controlling, based on the operation, the holding apparatus to execute the task to be executed for the target instance comprises:

determining, from the environment image information, an object to be held corresponding to the target instance;

determining, based on the operation, movement parameter information of the object to be held; and controlling the holding apparatus to execute the task to be executed for the target instance based on the movement parameter information.

According to one or more embodiments of the present disclosure, there is provided a task execution apparatus, comprising:

a display unit, configured to display acquired environment image information; and a control unit, configured to control a holding apparatus to execute a task corresponding to an operation of a user on the environment image information in response to the operation of the user on the environment image information.

According to one or more embodiments of the present disclosure, the apparatus is further configured to:

perform instance segmentation on the environment image information to obtain at least one first instance corresponding to at least one object comprised in the environment image information;

display the at least one first instance;

determine a target instance that is operated on and a task to be executed for the target instance in response to an operation of the user on any first instance in the at least one first instance; and controlling the holding apparatus to execute the task corresponding to the operation comprises: controlling, based on the operation, the holding apparatus to execute the task to be executed for the target instance.

According to one or more embodiments of the present disclosure, the apparatus is further configured to:

for any object in the at least one object, obtain an instruction from the user for performing instance segmentation on the object, and perform instance segmentation on the object to obtain at least one second instance corresponding to the object; and use the at least one second instance as a first instance corresponding to the object.

According to one or more embodiments of the present disclosure, the apparatus, when being configured to control, based on the operation, the holding apparatus to execute the task to be executed for the target instance, is specifically configured to:

determine, from the environment image information, an object to be held corresponding to the target instance;

determine, based on the operation, movement parameter information of the object to be held; and control the holding apparatus to execute the task to be executed for the target instance based on the movement parameter information.

According to one or more embodiments of the present disclosure, the apparatus, when being configured to determine the movement parameter information of the object to be held based on the operation, is specifically configured to:

when the operation is an operation of the user to move the target instance, obtain an initial position of the target instance;

obtain a target position to which the target instance is moved; and determine the movement parameter information of the object to be held based on the initial position and the target position.

According to one or more embodiments of the present disclosure, the apparatus, when being configured to determine the movement parameter information of the object to be held based on the initial position and the target position, is specifically configured to:

determine a movement trajectory of the holding apparatus based on the initial position and the target position; and determine the movement parameter information of the object to be held based on the movement trajectory.

According to one or more embodiments of the present disclosure, there is provided an electronic device, comprising:

a processor; and a memory, configured to store executable instructions of the processor, where the processor is configured to execute the foregoing methods by executing the executable instructions.

According to one or more embodiments of the present disclosure, there is provided a computer-readable storage medium, where the foregoing methods are implemented when a computer program is executed by a processor.

Persons of ordinary skill in the art may be aware that the modules and algorithm steps of the examples described in combination with the embodiments disclosed herein can be implemented in electronic hardware, or a combination of computer software and electronic hardware. Whether these functions are performed in hardware or software depends on the specific application and design constraint conditions of the technical solution. Persons skilled in the art may implement the described functions for each specific application using different methods, but such implementation should not be considered as going beyond the scope of the present disclosure.

In the several embodiments provided in the present disclosure, it should be understood that the disclosed system, apparatus, and method may be implemented in other manners. For example, the foregoing apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings, direct couplings, or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical modules, and may be located in one position, or may be distributed on a plurality of network units. Some or all of the modules may be selected based on actual needs to achieve the objectives of the solutions of the embodiments. For example, the functional modules in each embodiment of the present disclosure may be integrated into one processing module, each module may exist alone physically, or two or more modules may be integrated into one module.

The foregoing descriptions are merely specific implementations of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A task execution method, applicable to an intelligent robot, wherein the intelligent robot is configured with a holding apparatus, and wherein the method comprises:

displaying an environment image; and controlling the holding apparatus to execute a task, in response to an operation of the user on the environment image, wherein the task corresponds to the operation, wherein the controlling the holding apparatus to execute a task, in response to an operation of a user on the environment image, comprises:

in response to an operation of the user on an instance, controlling the holding apparatus to execute a task for the instance, wherein the instance corresponds to an object in the environment image, and wherein the task for the instance comprises performing an operation for the object, the operation for the object corresponding to the operation of the user on the instance, and wherein the operation of the user on the instance comprises any one or more of the following operations:

an operation to move the instance;

an operation to rotate the instance; or an operation on the instance itself.

2. The method according to claim 1, wherein the method further comprises:

performing instance segmentation on the environment image to obtain at least one first instance corresponding to at least one object in the environment image;

displaying the at least one first instance;

in response to an operation of the user on any first instance in the at least one first instance, acquiring the instance that is operated on and the task for the instance.

3. The method according to claim 2, wherein the method further comprises:

for any object in the at least one object, obtaining an instruction from the user for performing instance segmentation on the object, and performing instance segmentation on the object to obtain at least one second instance corresponding to the object; and using the at least one second instance as a first instance corresponding to the object.

4. The method according to claim 1, wherein the operation of the user on the instance is implemented in any one or more of the following manners:

clicking the instance, or sliding the instance.

5. The method according to claim 2, wherein the method further comprises:

determining, for each first instance in the at least one first instance, a three-dimensional model corresponding to the first instance; and the displaying the at least one first instance comprises: displaying at least one three-dimensional model corresponding to the at least one first instance.

6. The method according to claim 1, wherein in response to an operation of the user on an instance, controlling the holding apparatus to execute a task for the instance, comprises:

determining, from the environment image, an object to be held corresponding to the instance;

determining, based on the operation, movement parameter information of the object to be held; and controlling the holding apparatus to execute the task for the instance based on the movement parameter information.

7. The method according to claim 6, wherein the determining, based on the operation, the movement parameter information of the object to be held comprises:

in response to the operation being an operation of the user to move the instance, obtaining an initial position of the instance;

obtaining a position to which the instance is moved; and determining the movement parameter information of the object to be held based on the initial position and the position to which the instance is moved.

8. The method according to claim 7, wherein the determining the movement parameter information of the object to be held based on the initial position and the position to which the instance is moved, comprises:

determining a movement trajectory of the holding apparatus based on the initial position and the position to which the instance is moved; and determining the movement parameter information of the object to be held based on the movement trajectory.

9. An electronic device, applicable to an intelligent robot, wherein the intelligent robot is configured with a holding apparatus, wherein the electronic device comprises:

a processor; and a memory, configured to store executable instructions for the processor, wherein the processor is configured to execute the executable instructions to perform:

displaying an environment image; and controlling the holding apparatus to execute a task, in response to an operation of a user on the environment image, wherein the task corresponds to the operation, wherein the controlling the holding apparatus to execute a task, in response to an operation of a user on the environment image, comprises:

in response to an operation of the user on an instance, controlling the holding apparatus to execute a task for the instance, wherein the instance corresponds to an object in the environment image, and wherein the task for the instance comprises performing an operation for the object, the operation for the object corresponding to the operation of the user on the instance, and wherein the operation of the user on the instance comprises any one or more of the following operations:

an operation to move the instance;

an operation to rotate the instance; or an operation on the instance itself.

10. The electronic device according to claim 9, wherein the processor is configured to execute the executable instructions to further perform:

performing instance segmentation on the environment image to obtain at least one first instance corresponding to at least one object in the environment image;

displaying the at least one first instance;

in response to an operation of the user on any first instance in the at least one first instance, acquiring the instance that is operated on and the task for the instance.

11. The electronic device according to claim 10, wherein the processor is configured to execute the executable instructions to further perform:

for any object in the at least one object, obtaining an instruction from the user for performing instance segmentation on the object, and performing instance segmentation on the object to obtain at least one second instance corresponding to the object; and using the at least one second instance as a first instance corresponding to the object.

12. The electronic device according to claim 10, wherein the processor is configured to execute the executable instructions to further perform:

determining, for each first instance in the at least one first instance, a three-dimensional model corresponding to the first instance; and the displaying the at least one first instance comprises: displaying at least one three-dimensional model corresponding to the at least one first instance.

13. The electronic device according to claim 10, wherein the in response to an operation of the user on an instance, controlling the holding apparatus to execute a task for the instance comprises:

determining, from the environment image, an object to be held corresponding to the instance;

determining, based on the operation, movement parameter information of the object to be held; and controlling the holding apparatus to execute the task for the instance based on the movement parameter information.

14. The electronic device according to claim 13, wherein the determining, based on the operation, the movement parameter information of the object to be held comprises:

in response to the operation being an operation of the user to move the instance, obtaining an initial position of the instance;

obtaining a position to which the instance is moved; and determining the movement parameter information of the object to be held based on the initial position and the position to which the instance is moved.

15. A non-transitory computer-readable storage medium having a computer program stored thereon, wherein the computer program, when executed by a processor, causes implementation of:

displaying an environment image; and controlling the holding apparatus of an intelligent robot to execute a task, in response to an operation of a user on the environment image, wherein the task corresponds to the operation, wherein the controlling the holding apparatus of an intelligent robot to execute a task, in response to an operation of a user on the environment image, comprises:

in response to an operation of the user on an instance, controlling the holding apparatus to execute a task for the instance, wherein the instance corresponds to an object in the environment image, and wherein the task for the instance comprises performing an operation for the object, the operation for the object corresponding to the operation of the user on the instance, and wherein the operation of the user on the instance comprises any one or more of the following operations:

an operation to move the instance;

an operation to rotate the instance; or an operation on the instance itself.

16. The non-transitory computer-readable storage medium according to claim 15, wherein the computer program, when executed by a processor, causes further implementation of:

performing instance segmentation on the environment image to obtain at least one first instance corresponding to at least one object in the environment image;

displaying the at least one first instance;

in response to an operation of the user on any first instance in the at least one first instance, acquiring the instance that is operated on and the task for the instance.

17. The non-transitory computer-readable storage medium according to claim 16, wherein the computer program, when executed by a processor, causes further implementation of:

for any object in the at least one object, obtaining an instruction from the user for performing instance segmentation on the object, and performing instance segmentation on the object to obtain at least one second instance corresponding to the object; and using the at least one second instance as a first instance corresponding to the object.

18. The non-transitory computer-readable storage medium according to claim 16, wherein the computer program, when executed by a processor, causes further implementation of:

determining, for each first instance in the at least one first instance, a three-dimensional model corresponding to the first instance; and the displaying the at least one first instance comprises: displaying at least one three-dimensional model corresponding to the at least one first instance.

19. The non-transitory computer-readable storage medium according to claim 16, wherein the in response to an operation of the user on an instance, controlling the holding apparatus to execute a task for the instance, comprises:

determining, from the environment image, an object to be held corresponding to the instance;

determining, based on the operation, movement parameter information of the object to be held; and controlling the holding apparatus to execute the task for the instance based on the movement parameter information.

* * * * *